S. HALL.
COUPLING FOR SHAFTING.
No. 28,474. Patented May 29, 1860.
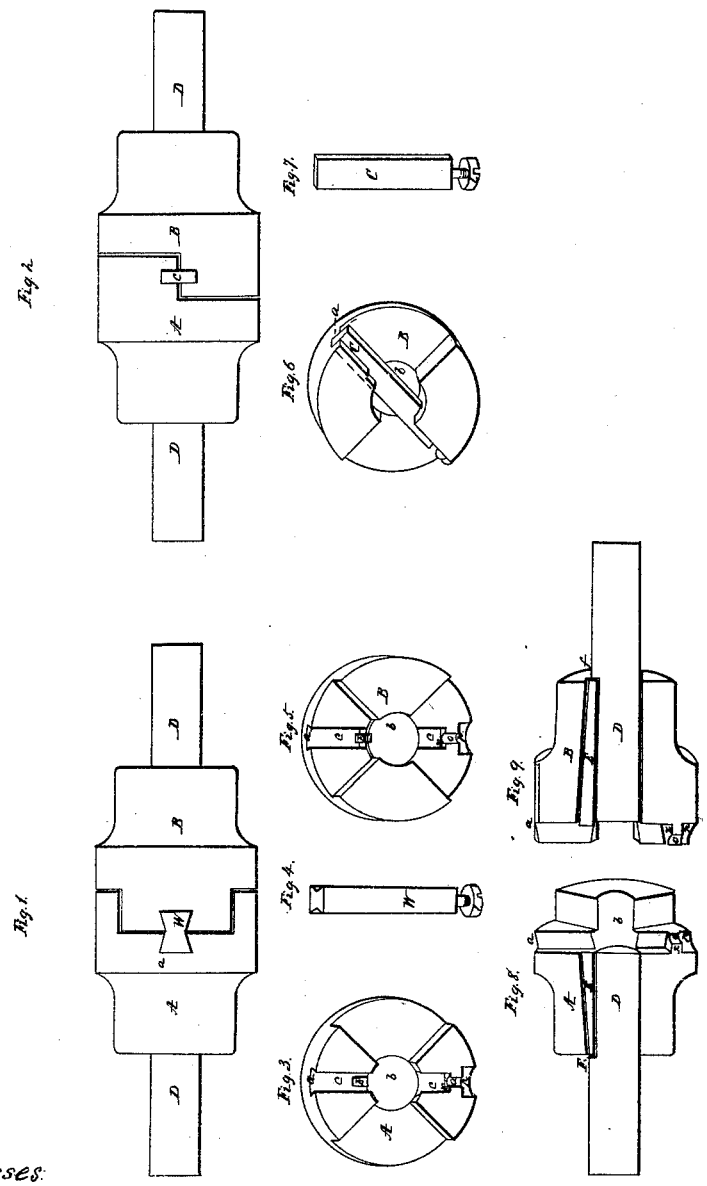

UNITED STATES PATENT OFFICE.

SAMUEL HALL, OF NEW YORK, N. Y.

COUPLING FOR SHAFTING.

Specification of Letters Patent No. 28,474, dated May 29, 1860.

*To all whom it may concern:*

Be it known that I, SAMUEL HALL, of New York, in the county and State of New York, have invented, made, and applied to use certain new and useful Improvements in the Coupling of Shafting, Shafts, and Rods; and I do hereby declare the following to be a full, clear, and exact description of the same, reference being had to the accompanying drawings, and to the letters of reference marked thereon, in which—

Figure I, is a top view of my improved mode of coupling shafting when the dovetailed cross-key is employed; Fig. II, top view of the same, when the straight cross-key is employed; Figs. III and V, detached face views of coupling, showing slot intended for introduction of cross-key—also slot for longitudinal key which holds portion of shafting to be coupled, in position; Fig. IV, a perspective view of dovetailed cross-key employed; Fig. VI, detached face view of coupling, showing the position of cross-key inserted. Fig. VII, perspective view of straight cross key employed; Figs. VIII and IX, cut sectional views of the coupling, with portions of shafting to be coupled, introduced—also the longitudinal keys, fitting into and holding the same in position.

In the drawings, similar parts of the invention are designated by the same letters.

The nature of my invention consists in a ready and direct mode of coupling shafts or portions of shafting and rods, by the employment of which the same are more compactly and securely held together than heretofore, attended at the same time with a saving of money and labor.

To enable others skilled in the art, to make and use my invention, I will describe its construction and operation.

*1st. Of the coupling.*—I employ what is generally known as the clutch or box coupling, formed of two portions or sections designated in the drawings as A and B—so arranged that the jaws on one section of the coupling fit snugly into the recesses on the other section. These sections (A and B) being thus joined, are slotted on their upper or top side, (*a*) for the reception of the cross-key (*c*) operating as hereinafter described.

*2nd. Of the shafts or portions of shafting to be coupled.*—The shafts or portions of shafting to be coupled (D D) are introduced into the coupling formed of the sections (A and B) through the openings (*b, b*) at the ends of the same and are provided with slots (*c, c*) to accommodate the longitudinal keys (E, E), which hold firmly in position the shafts or portions of shafting (D D) to be coupled, inserted as they are from the interior of the coupling and fitting into the slots (*c c*) on the shafts (D, D) and the slots (*f, f*) in the coupling. The slots (*c, c*) are inclined slots, to allow the shafts or portions of shafting (D, D) to be detached or removed readily, by shoving out the longitudinal keys (E E).

*3rd. Of the longitudinal parallel keys.*—These (E, E) are wedge-shaped and are intended to hold the shafts or portions of shafting to be coupled firmly in position. The shafts (D, D) to be coupled having been inserted into the coupling through the openings (*b b*) at the ends of the same, the longitudinal keys (E E) are inserted from the interior of the coupling fitting tightly into the space formed by the slots in the coupling and the slots upon the shafts introduced.

*4th. Of the cross-key.*—This is made of any desired shape—the coupling being slotted to correspond with the shape of cross-key employed. In the present instance two shapes are shown—one dovetailed and one straight. The cross-key (W) is inserted through a slot, (corresponding in form with the key used,) cut in the center of the top or upper side of the coupling, passes entirely through the same, until it reaches the flange or projection (*x*) on the bottom side of the coupling, upon which it rests, while its thread passes through the opening (*o*) into the recess (*p*). A screw-driver threaded nut (*l*) introduced into this recess, holds the cross-key (W) in position. The duties of the cross-key (W) may be thus defined. It connects and fastens securely the sections (A and B) of the coupling, and by so doing prevents their becoming disengaged or working apart. It bears directly against the longitudinal keys (E E) and keeps them in position and prevents their working out of place.

I am fully aware that the box or clutch coupling is old. I do not desire to claim the same, considered separately.

I claim as new and desire to secure by Letters Patent—

The use or employment of the cross-key W, in combination with the longitudinal keys E, E and slotted shafts D, D, said shafts being coupled within the box or clutch coupling, composed of the sections A and B, the whole arranged and operated as herein set forth and for the purpose specified.

SAMUEL HALL.

In presence of:
A. SIDNEY DOANE,
GEO. W. CARPENTER.